(12) United States Patent
Schneider

(10) Patent No.: US 10,569,879 B2
(45) Date of Patent: Feb. 25, 2020

(54) AIRCRAFT CEILING LINER ELEMENT WITH A CARRIER PLATFORM

(71) Applicant: Airbus Operations GmbH, Hamburg (DE)

(72) Inventor: Uwe Schneider, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 376 days.

(21) Appl. No.: 15/487,983

(22) Filed: Apr. 14, 2017

(65) Prior Publication Data

US 2017/0297714 A1 Oct. 19, 2017

(30) Foreign Application Priority Data

Apr. 15, 2016 (DE) .................... 10 2016 206 383

(51) Int. Cl.
| | |
|---|---|
| *B64C 1/06* | (2006.01) |
| *B64D 11/00* | (2006.01) |
| *B64C 1/22* | (2006.01) |
| *B64D 45/00* | (2006.01) |

(52) U.S. Cl.
CPC ............ *B64D 11/003* (2013.01); *B64C 1/066* (2013.01); *B64C 1/22* (2013.01); *B64D 11/0015* (2013.01); *B64D 45/00* (2013.01)

(58) Field of Classification Search
CPC .... B64D 11/003; B64D 11/0015; B64C 1/066
See application file for complete search history.

(56) References Cited

U.S. PATENT DOCUMENTS

| | | | |
|---|---|---|---|
| 7,246,865 B1 | 7/2007 | Merrell, II | |
| 9,365,291 B2* | 6/2016 | Savian | .................... B64D 11/00 |
| 9,499,269 B2* | 11/2016 | Ivester | .................... B64C 1/066 |
| 9,994,318 B2* | 6/2018 | Roese | ................ B64D 11/0015 |
| 10,029,794 B2* | 7/2018 | Savian | ............... B64D 11/0015 |
| 10,407,172 B2* | 9/2019 | Voss | ..................... B64D 11/003 |
| 2004/0016847 A1 | 1/2004 | Ritts | |
| 2007/0133217 A1 | 6/2007 | Tiesler et al. | |

(Continued)

FOREIGN PATENT DOCUMENTS

| | | |
|---|---|---|
| DE | 202015106937 | 3/2016 |
| WO | 2016123551 | 4/2016 |

OTHER PUBLICATIONS

German Search Report, dated Feb. 2, 2017 for Appl. No. 10 2016 206 383.9.

*Primary Examiner* — Brian M O'Hara
(74) *Attorney, Agent, or Firm* — Greer, Burns & Crain Ltd.

(57) ABSTRACT

An aircraft ceiling liner element comprises a load-bearing carrier platform, configured to form a part of an aircraft ceiling liner, and a mounting mounted on the carrier platform, connectable to a primary structure of the aircraft. An electrical connection mounted on the carrier platform is connectable to an electrical supply network of the aircraft. Furthermore, the aircraft ceiling liner element comprises a mechanical interface mounted on the carrier platform, configured to attach various interchangeable modular units detachably and in a load-transferring manner to the carrier platform, and an electrical interface mounted on the carrier platform, which interface is configured to create an electrical connection between the modular unit and the carrier platform.

13 Claims, 8 Drawing Sheets

(56) References Cited

U.S. PATENT DOCUMENTS

| | | |
|---|---|---|
| 2014/0299711 A1 | 10/2014 | Ivester et al. |
| 2015/0151679 A1 | 6/2015 | Aruga et al. |
| 2016/0075424 A1 | 3/2016 | Giacalone et al. |
| 2016/0193484 A1* | 7/2016 | Riedel .................... A62B 7/14 128/202.13 |
| 2018/0103554 A1* | 4/2018 | Ibrahim ............ B64D 11/0015 |

* cited by examiner

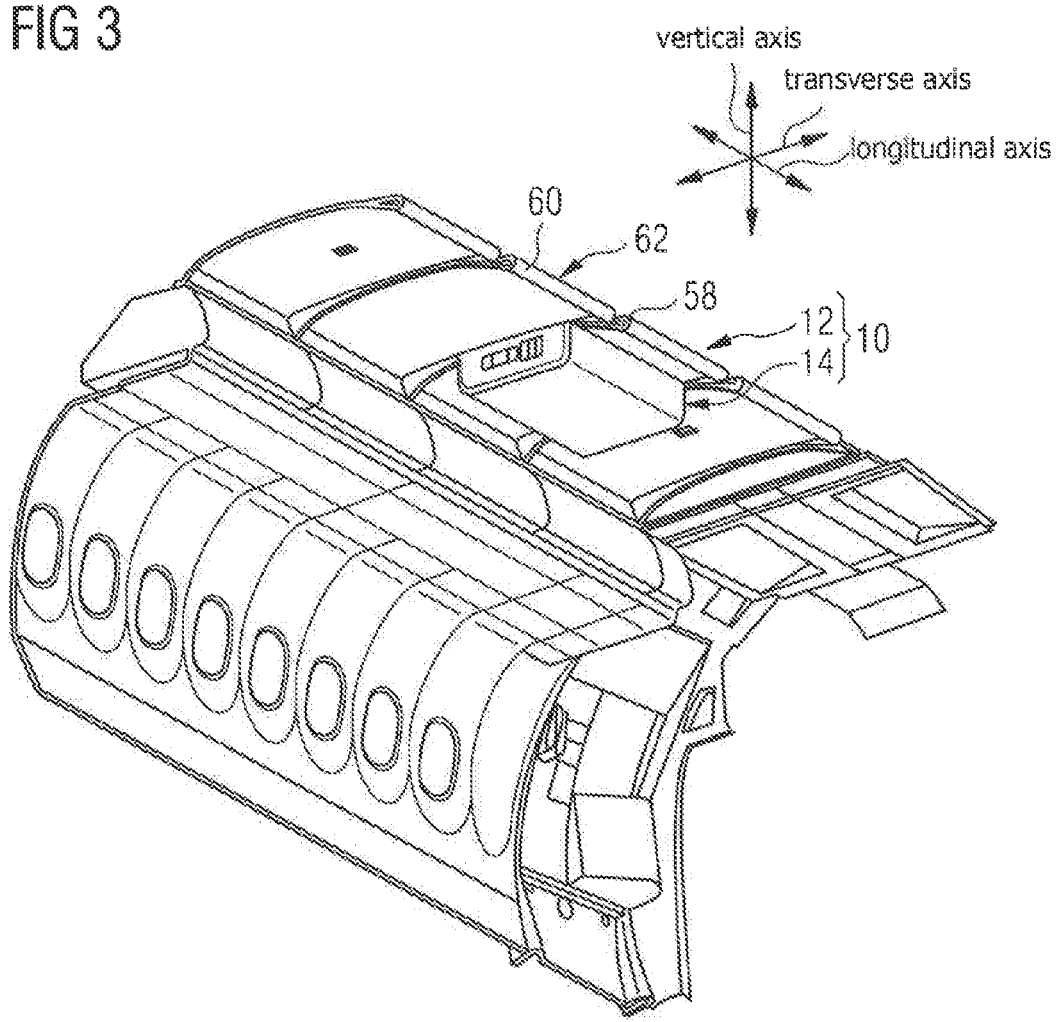

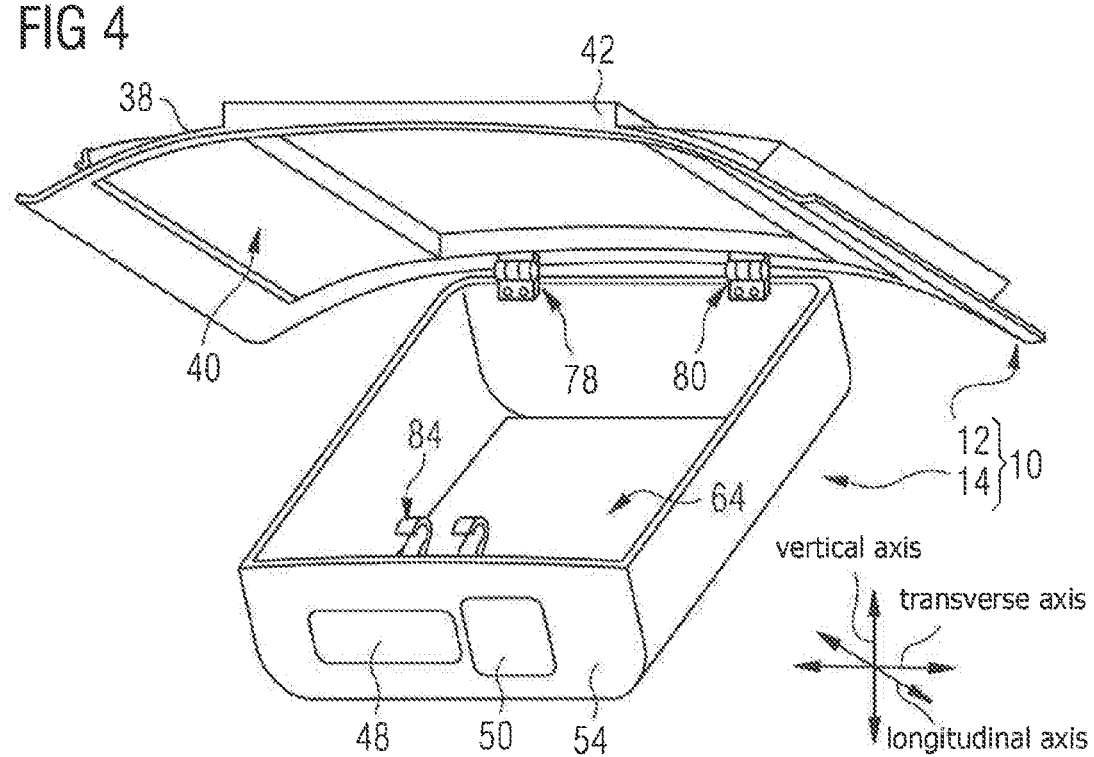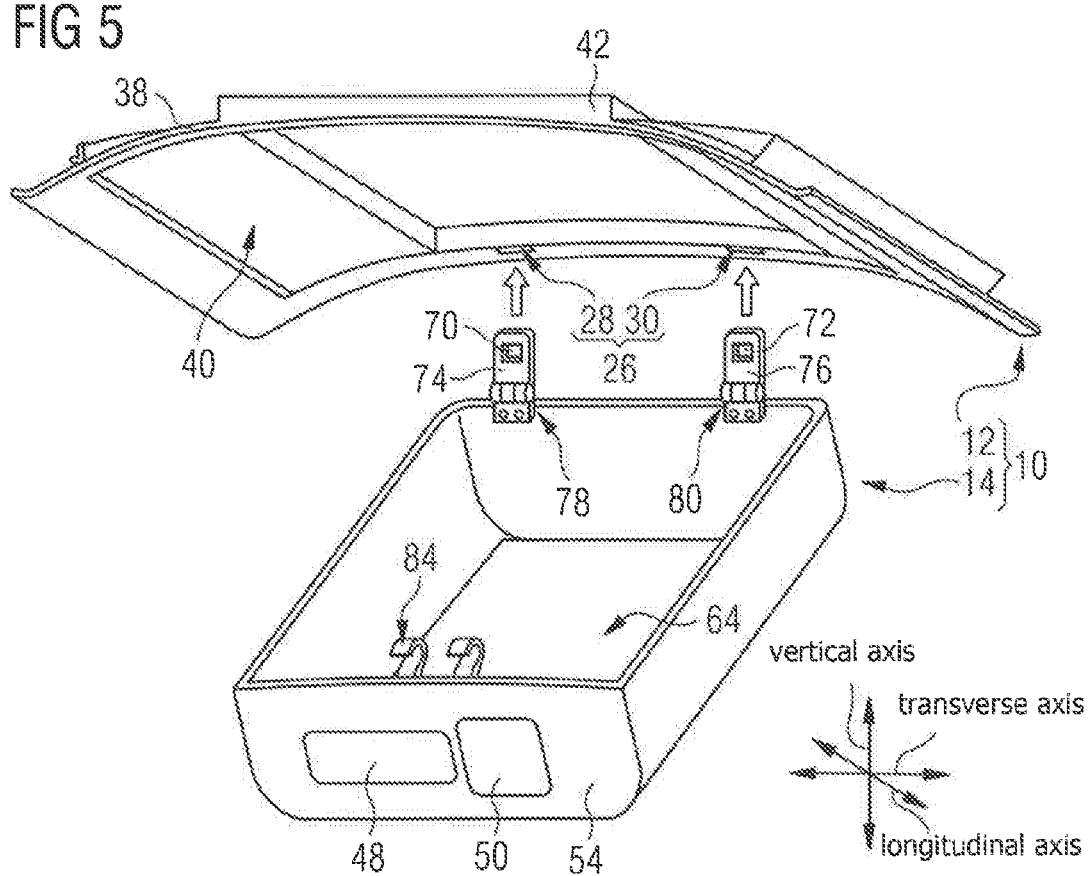

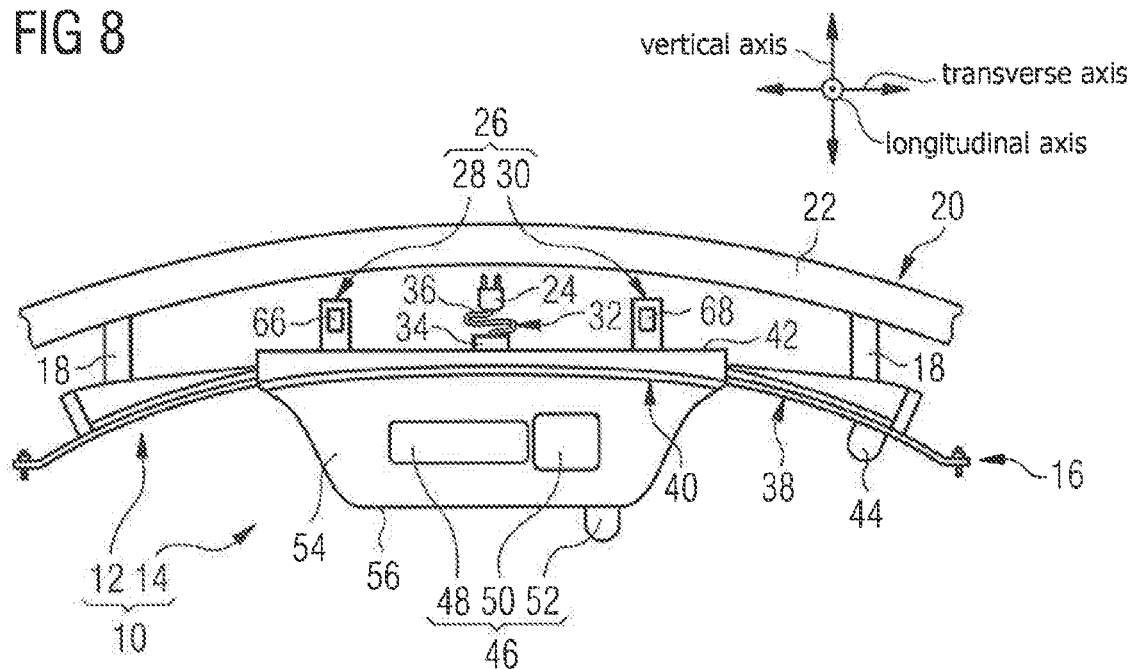
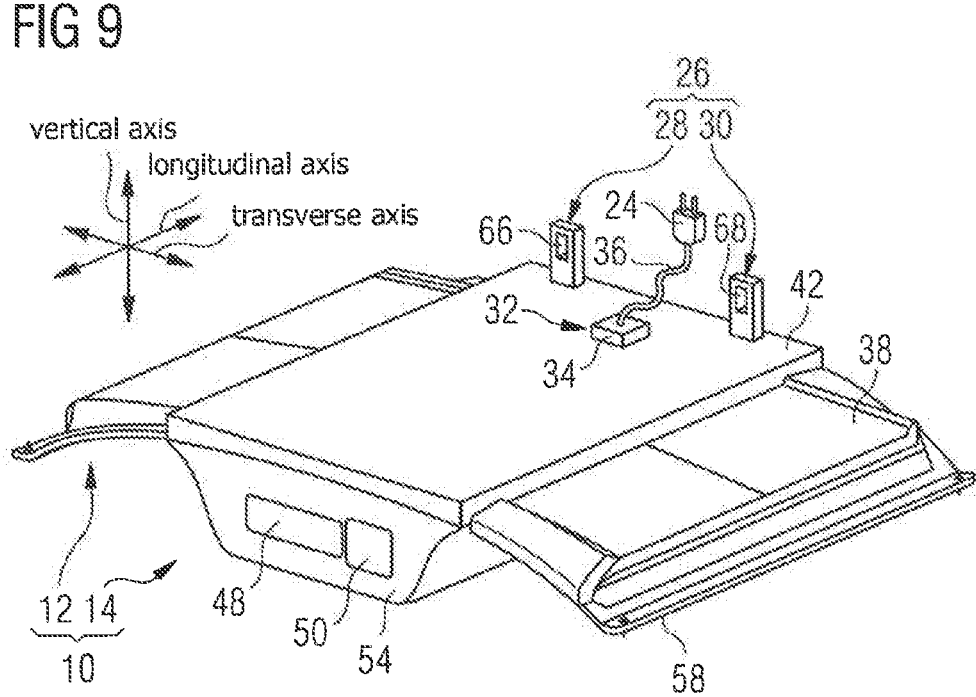

AIRCRAFT CEILING LINER ELEMENT WITH A CARRIER PLATFORM

CROSS REFERENCE TO RELATED APPLICATIONS

This application claims priority to German Patent Application No. 10 2016 206 383.9 filed on Apr. 15, 2016, the entirety of which is incorporated herein by reference.

FIELD OF THE INVENTION

The invention relates to an aircraft ceiling liner element, an aircraft ceiling liner system and a method for the installation of such an aircraft ceiling liner system in an aircraft.

The flexible use of passenger aircraft is a requirement that is steadily growing in importance, especially for single-aisle passenger aircraft. Passenger aircraft are to be used accordingly for different purposes, such as for short-, medium- and long-haul flights, for example, as well as for flights over land and water. Depending on the type of use of the passenger aircraft, the items of equipment necessary for the respective deployments vary and must be carried in stowage spaces of the passenger aircraft envisaged for these.

Passenger aircraft currently in use comprise various stowage spaces and stowage space options for receiving different items of equipment, such as emergency equipment, wheelchairs, etc., for example. Such stowage spaces and stowage space options are usually arranged in areas along a cabin wall, for example in the area of an aircraft galley, in areas of a luggage compartment provided for this, behind a last row of passenger seating of an aircraft cabin section, etc.

Furthermore, storage compartments are known from the prior art, such as e.g. from U.S. Pat. No. 7,246,865 B1 and US 2004/0016847 A1, which compartments are arranged in the area of an aircraft ceiling liner.

US 2014/0299711 A1 further discloses an overhead luggage compartment fitted into an aircraft ceiling liner panel, which compartment has a base plate provided with an opening and mounted on a support structure of the aircraft, wherein a luggage bin is inserted via the opening of the base plate in the ceiling liner panel.

An object of the invention is to provide a flexible, easily configurable receptacle and stowage option for items of equipment in an aircraft cabin that makes efficient use of a space available in the aircraft cabin.

SUMMARY OF THE INVENTION

This object may be achieved by an aircraft ceiling liner element with the features according to one or more embodiments described herein, an aircraft ceiling liner system with the features according to one or more embodiments described herein, and a method for the installation of such an aircraft ceiling liner system in an aircraft with the features according to one or more embodiments described herein.

An aircraft ceiling liner element comprises a load-bearing carrier platform, which is configured to form a part of an aircraft ceiling liner, and a mounting fitted on the carrier platform, which is connectable to a primary structure of the aircraft. The mounting may be provided to transfer a mechanical load taken up by the carrier platform to the primary structure of the aircraft.

The aircraft ceiling liner element can be used in various types of aircraft, such as, e.g., single-aisle aircraft or wide-bodied aircraft, in particular twin-aisle aircraft. In current aircraft, the ceiling liner of the aircraft interior cabin is normally formed by several standard aircraft ceiling liner elements, in particular in the form of standard aircraft ceiling panels. The standard aircraft ceiling liner elements are arranged adjoining one another along a longitudinal axis of the aircraft and are attached to fixing points on overhead storage compartments or structural areas of the aircraft arranged above these. Since low weight is essential for such standard aircraft ceiling liner elements, these are not envisaged to take up additional loads.

The aircraft ceiling liner element may be configured to be installed in an aircraft instead of a standard aircraft ceiling liner element. A peripheral contour of the carrier platform of the aircraft ceiling liner element may correspond in this case to a contour of the standard aircraft ceiling liner element, so that the aircraft ceiling liner element can be installed in the aircraft instead of the standard aircraft ceiling liner element. The aircraft ceiling liner element can thereby be installed with a reduced outlay at different positions in an aircraft. In particular, common aircraft can thus be equipped with the aircraft ceiling liner element proposed here even retrospectively.

The aircraft ceiling liner element comprises an electrical connection mounted on the carrier platform, which can be connected to an electrical supply system of the aircraft. The electrical supply system may be a prioritized electrical supply system of the aircraft. An electrical supply to the aircraft ceiling liner element can be ensured by this in an installed state of the aircraft ceiling liner element in an aircraft, even in an emergency situation of the aircraft.

A mechanical interface mounted on the carrier platform is configured to attach various interchangeable modular units detachably and in a load-transferring manner to the carrier platform. Furthermore, the aircraft ceiling liner element comprises an electrical interface mounted on the carrier platform, which interface is configured to create an electrical connection between the modular unit and the carrier platform. The electrical interface is preferably connected to the electrical connection of the aircraft ceiling liner element. The mechanical and/or electrical interface may be provided in particular in the form of a plug-and-play interface.

The aircraft ceiling liner element proposed herein makes available a receptacle option for different modular units, in which, in the installed state of the aircraft ceiling liner element in an aircraft, a modular unit to be attached thereto may be arranged in the area of an aircraft ceiling liner. A receptacle or storage option is provided by this for items of equipment in an area of an aircraft cabin that is unused in current passenger aircraft. The solution proposed here can thus contribute to a more efficient utilization of space in an aircraft cabin.

Because the interchangeable modular units may be mounted detachably and in a load-transferring manner on the aircraft ceiling liner element, an aircraft equipped with the aircraft ceiling liner element can easily be configured and thus adapted to different usage requirements. To this end the present solution provides the mechanical interface and electrical interface mounted on the carrier platform, which are configured to create a structural and electrical connection to the modular unit to be attached to the aircraft ceiling liner element. Thus, both structurally and functionally different modular units, such as e.g. storage compartments of different sizes, display monitors etc., can be attached to the aircraft ceiling liner elements. The aircraft ceiling liner element thus has a high flexibility in respect of taking up different modular units.

The load-bearing carrier platform of the aircraft ceiling liner element may comprise a frame element. The frame element is preferably provided to absorb forces and thus for the mechanical stabilization of the carrier platform. The mounting of the aircraft ceiling liner element is preferably fitted in this case on the frame element. The frame element may comprise a metal material and be provided in particular in the form of a sheet metal component. Alternatively or in addition, the frame element may comprise a plastic and/or a composite material.

The frame element may be provided with a recess, in which the various interchangeable modular units can be taken up at least in sections. The recess may be formed in particular in the form of a through opening.

In addition, the carrier platform may comprise a panel element connected to the frame element. In the installed state of the aircraft ceiling liner element in the aircraft, the panel element can be connected to the frame element on a side of the frame element facing the primary structure of the aircraft. Furthermore, the panel element may cover the recess provided in the frame element.

The mechanical interface and/or the electrical interface of the aircraft ceiling liner element is/are preferably mounted on the panel element of the carrier platform. Alternatively, however, the mechanical interface and/or the electrical interface of the aircraft ceiling liner element can also be mounted on the frame element of the carrier platform.

In a further development of the aircraft ceiling liner element, the mechanical interface may be configured to attach the various interchangeable modular units to the carrier platform in such a way that at least one of the various interchangeable modular units, in particular a modular unit provided in the form of a storage compartment with a storage volume, is movable between a closed position and an opening position. In the closed position, the modular unit provided in the form of a storage compartment is attached to the carrier platform and fixed relative to this in order to stow a transported item taken up therein securely. The modular unit provided in the form of a storage compartment may rest in particular on the carrier platform in this case. In the opening position, the modular unit provided in the form of a storage compartment is arranged displaced, in particular pivoted, compared with the closed position, so that a stowage space of the modular unit provided in the form of the storage compartment is released for loading and unloading.

In particular, the mechanical interface may comprise a first latching element, which is configured to latch detachably with a complementary second latching element mounted on the various interchangeable modular units, in order to attach one of the various interchangeable modular units in a load-transferring manner to the carrier platform. The first latching element may be formed in particular on a hinge seat, into which one limb of a hinge mounted on the various interchangeable modular units can be inserted, in order to attach one of the various interchangeable modular units to the carrier platform pivotably between the closed position and the opening position.

The first latching element may be provided in the form of an opening formed in the hinge seat, wherein the second latching element may be a flexibly preloaded projection on the limb of the hinge. The projection of the first limb may be flexibly preloaded in the direction of the opening formed in the hinge seat in an inserted state in the hinge seat. According to this arrangement, a latching of the projection on the limb with the opening formed in the hinge seat can be achieved by inserting the limb of the hinge mounted on the various interchangeable modular units into the hinge seat of the mechanical interface.

In a further development, the hinge seat may be arranged in the carrier platform in such a way that the first latching element in the form of the opening formed in the hinge seat is accessible in particular via the recess provided in the frame element of the carrier platform. Accordingly, in a state in which the projection on the limb of the hinge is latched with the opening formed on the hinge seat, the projection on the limb can be uncoupled manually from the opening formed on the hinge seat by a fitter by moving the projection on the limb counter to the preloading direction of the same out of the opening.

Alternatively or in addition, the mechanical interface may comprise a first locking element, which is configured to interact detachably with a complementary second locking element mounted on the various interchangeable modular units, wherein one of the various interchangeable modular units is held in particular in the closed position on the carrier platform by the interaction of the first locking element with the second locking element.

The first locking element may be designed in the form of a projection, which is arranged preferably on the frame element of the carrier platform. The second locking element may be provided in the form of a hook element with a recess to take up the projection. The hook element may be mounted pivotably on the modular unit, in order to pivot the hook element between a locking position, in which the first and second locking element are in engagement with one another, and an unlocking position, in which the first and second locking element are detached from one another.

The electrical interface of the aircraft ceiling liner element may comprise a connection element for the connection of an electrical connector of the one of the various interchangeable modular units. Furthermore, the electrical interface may comprise a connection cable, which is configured for connection of the electrical interface to the electrical supply network of the aircraft, in particular via the electrical connection of the aircraft ceiling liner element. The connection element may be arranged in particular in the area of a surface of the panel element of the carrier platform that faces away from the primary structure of the aircraft in an installed state of the aircraft ceiling liner element in the aircraft. Here the connection element may be arranged in an area of a section of the panel element covering the recess in the carrier platform. The connection cable of the electrical interface may be arranged in particular in the area of a surface of the panel element of the carrier platform facing the primary structure of the aircraft in an installed state of the aircraft ceiling liner element in the aircraft.

In a further development of the aircraft ceiling liner element, at least one lighting unit may be mounted on the carrier platform, in particular on the frame element. The first lighting unit may be connectable via the electrical interface to the electrical supply network of the aircraft. The first lighting unit may comprise an emergency lighting element that is configured to illuminate a path leading to an emergency exit of the aircraft and/or a cabin floor of the aircraft. Alternatively or in addition, the first lighting unit may comprise at least one flight attendant call light. The flight attendant call light and/or the emergency lighting element is/are preferably arranged in the area of an end section of the carrier platform arranged in the direction of a transverse axis of the aircraft.

The mounting of the aircraft ceiling liner element is provided for fixing the aircraft ceiling liner element firmly to the primary structure of the aircraft, in order to guarantee a stable structural connection between the aircraft ceiling liner element and the primary structure in different operating phases of the aircraft when in the installed state of the aircraft ceiling liner element in an aircraft. To this end the mounting may be configured to be connected to a section of the primary structure, which section is arranged adjacent to the aircraft ceiling liner in the installed state of the aircraft ceiling liner element in an aircraft. In particular, the mounting may be connectable to at least one rib and/or stringer of the primary structure of the aircraft.

The mounting may comprise at least one mounting element, which is configured to transmit forces and moments acting on the aircraft ceiling liner element in any direction in the installed state of the aircraft ceiling liner element in an aircraft to the primary structure. The mounting may be connected for this purpose at a first end to the carrier platform, in particular to the frame element of the carrier platform. At a second end opposite to the first end, the mounting element may be connected in the installed state of the aircraft ceiling liner element in an aircraft to the primary structure of the aircraft, in particular to one or more ribs and/or one or more stringers. The second end of the mounting element may be connected in this case in particular in the area of an intersection point between a rib and a stringer of the primary structure of the aircraft.

The at least one mounting element may be designed, for example, in the form of a pressed sheet metal part, a rod, a strut, a bar, etc. The mounting element may be formed here in such a way that in the installed state of the aircraft ceiling liner element in an aircraft, a through opening, in particular a through opening extending in a longitudinal direction of the aircraft, is formed between the carrier platform and the primary structure of the aircraft, in which opening supply lines of the aircraft may be arranged.

The mounting may comprise at least one first mounting element, which extends in the installed state of the aircraft ceiling liner element in an aircraft along the vertical axis of the aircraft. The first mounting element may be configured here in particular to transmit forces acting on the aircraft ceiling liner element in the direction of the vertical axis of the aircraft to the primary structure.

Alternatively or in addition, the mounting may comprise at least one second mounting element, which extends in the installed state of the aircraft ceiling liner element in an aircraft along an axis that lies in a plane spanned by the vertical axis and the transverse axis of the aircraft and is arranged in particular at an angle offset to the vertical axis. The second mounting element may be configured here in particular to transmit forces acting on the aircraft ceiling liner element in the direction of the transverse axis of the aircraft to the primary structure.

Furthermore, the mounting may comprise at least one third mounting element, which extends in the installed state of the aircraft ceiling liner element in an aircraft along an axis that lies in a plane spanned by the vertical axis and the longitudinal axis of the aircraft and is arranged in particular at an angle offset to the vertical axis. The third mounting element may be configured here in particular to transmit forces acting on the aircraft ceiling liner element in the direction of the longitudinal axis of the aircraft to the primary structure of the aircraft.

An aircraft ceiling liner system comprises the aircraft ceiling liner element described previously and at least one modular unit, which is attached detachably, in a load-transferring manner and interchangeably with another modular unit to the carrier platform of the aircraft ceiling liner element.

The at least one modular unit may be a first storage compartment with a first storage volume, a second storage compartment with a second storage volume that is smaller than the first storage volume of the first storage compartment, a cover element, a lighting panel designed in particular in the form of an ambient light panel, a panel provided with a projector, a panel provided with a loudspeaker, a passive or active sound-absorbing panel and/or a display monitor. In the state of the modular unit mounted in an aircraft, the modular unit may extend at least in sections along a length of the carrier platform in the longitudinal direction of the aircraft and/or along a width of the carrier platform in the transverse direction of the aircraft. In particular, the modular unit may extend along an overall length of the carrier platform in the longitudinal direction of the aircraft and/or along an overall width of the carrier platform in the transverse direction of the aircraft.

In current passenger aircraft, displays, in particular safety-relevant displays, are arranged in the area of the ceiling liner, such as exit signs indicating a route to an emergency exit, for example. The known storage compartments arranged in the area of the aircraft ceiling liner are formed in this case such that a view of such displays for the passengers or crew members located in the aircraft is not impaired by the storage compartments.

In a further development of the aircraft ceiling liner system, a second lighting unit may be mounted on the modular unit. The second lighting unit may be connectable via the electrical interface, in particular by connection of the electrical connector of the modular unit to the connection element of the electrical interface, to the electrical supply network of the aircraft.

The second lighting unit may comprise an illuminated exit sign, an illuminated sign for displaying an operating status of a sanitary module, the flight attendant call light and/or the emergency lighting element. The exit sign and/or the sign for displaying an operating status of a sanitary module may be mounted in particular on an end face of the modular unit designed in the form of a storage compartment. The end face of the modular unit designed in the form of a storage compartment may extend substantially perpendicular to a longitudinal axis of the aircraft in the fitted state of the modular unit in an aircraft. Alternatively or in addition, the flight attendant call light and/or the emergency lighting element may be mounted on a base area of a modular unit designed in the form of a storage compartment. In this case the base area of the modular unit designed in the form of a storage compartment may face a cabin floor of the aircraft in the fitted state of the modular unit in an aircraft.

By the provision of the second lighting unit mounted on the modular unit, it may be ensured that, in the fitted state of the modular unit in an aircraft, displays, in particular safety-relevant displays, are visible for the passengers and/or crew members in the aircraft. The modular units to be attached to the carrier platform may accordingly be dimensioned larger compared with known storage compartments arranged in the area of an aircraft ceiling liner.

Because modular units are attached detachably, in a load-transferring manner and interchangeably with other modular units to the carrier platform, the receptacle and stowage space option provided by the aircraft ceiling liner system may be easily adapted and configured to the respective use of the aircraft.

In the case of a deployment of the aircraft in which an additional stowage space provided by the aircraft ceiling liner system is not required, for example on short-haul flights over land, the cover element may be fitted on the aircraft ceiling liner element. The cover element may be configured to cover the mechanical interface and/or the electrical interface of the carrier platform in a fitted state in an aircraft. In particular, the cover element may be arranged in this case completely in the recess of the carrier platform.

In types of use of the aircraft in which additional stowage space is required, for example in the case of flights over water, the modular unit provided in the form of a storage compartment, in particular in the form of the first or second storage compartment, may be attached detachably and in a load-transferring manner to the carrier platform. The storage compartment may be provided in this case for providing a stowage space for items of equipment, such as for wheelchairs or emergency equipment, in particular lifeboats, fire extinguishers, survival kits, etc. A modular unit formed as a storage compartment may have an interior provided with a recess for receiving a transport item, which interior forms the stowage space of the storage compartment. The recess may comprise side walls and/or a base, which have/has a shape that corresponds at least in sections to the shape of the transport item to be received therein. Thus, the transport item to be received in the modular unit formed as a storage compartment can be stowed safely therein without additional attachment means.

A method for the installation of an aircraft ceiling liner system in an aircraft comprises a step of mounting the previously described aircraft ceiling liner element in the aircraft by connection of the mounting fitted on the carrier platform of the aircraft ceiling liner element to the primary structure of the aircraft. Furthermore, the method comprises a step of the detachable and load-transferring attachment of the previously described modular unit, which is interchangeable with another modular unit, to the carrier platform with the mechanical interface mounted on the carrier platform.

The method may further comprise a step of creating an electrical connection between the modular unit and an electrical supply network of the aircraft with the electrical interface mounted on the carrier platform.

BRIEF DESCRIPTION OF THE DRAWINGS

Preferred practical examples of the invention are explained in the following with reference to the enclosed schematic drawings, wherein FIG. 3 shows a view in perspective of an aircraft cabin, in which the aircraft ceiling liner system shown in FIGS. 1 and 2 is installed, FIGS. 4 and 5 show a view in perspective of the aircraft ceiling liner system shown in FIGS. 1 to 3 arranged in an opening position, FIGS. 8 and 9 show a third embodiment of the aircraft ceiling liner system.

DETAILED DESCRIPTION OF EMBODIMENTS OF THE INVENTION

Figure 1:
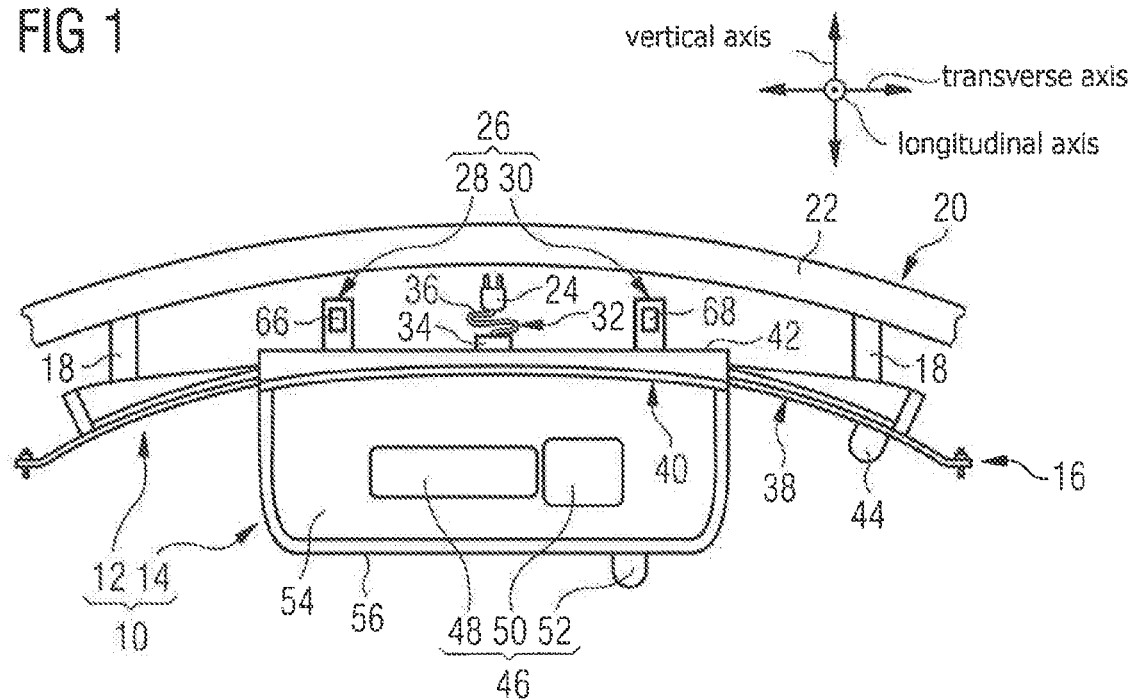
FIG. 1 shows a schematic front view of an aircraft ceiling liner system according to a first embodiment installed in an aircraft.

FIG. 1 shows a first embodiment of an aircraft ceiling liner system 10 installed in an aircraft. The aircraft ceiling liner system 10 comprises an aircraft ceiling liner element 12 and a modular unit 14 attached thereto, which is attached detachably, in a load-transferring manner and interchangeably with another modular unit to a carrier platform 16 of the aircraft ceiling liner element 12.

The carrier platform 16 is configured to form a part of an aircraft ceiling liner. A mounting 18 of the aircraft ceiling liner element 12 fitted on the carrier platform 16 is connected to a primary structure 20 of the aircraft. The mounting 18 is provided in the form of a suspension, which connects the carrier platform 16 to at least one rib 22 of the primary structure 20 of the aircraft.

Figure 2:
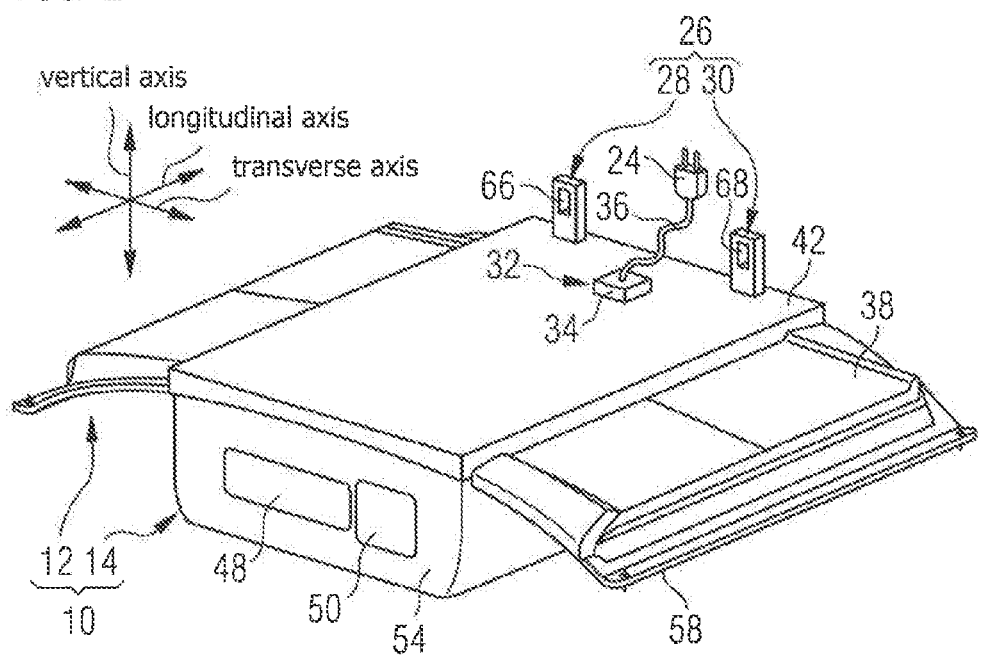
FIG. 2 shows a view in perspective of the aircraft ceiling liner system shown in FIG. 1.

FIG. 2 shows a top view in perspective of the aircraft ceiling liner system 10 shown in FIG. 1, in which view the mounting 18 connecting the carrier platform 16 to the primary structure 20 of the aircraft is not shown for reasons of clarity.

The aircraft ceiling liner element 12 further comprises an electrical connection 24, which is mounted on the carrier platform 16 and is connectable to an electrical supply network of the aircraft.

A mechanical interface 26 of the aircraft ceiling liner element 12 comprises a first hinge seat 28 and a second hinge seat 30 and is configured to attach various interchangeable modular units 14 detachably and in a load-transferring manner to the carrier platform 16. The aircraft ceiling liner element 12 further comprises an electrical interface 32 mounted on the carrier platform 16, which interface is configured to create an electrical connection between the modular unit 14 attached detachably and in a load-transferring manner to the carrier platform 16, and the carrier platform 16. The electrical interface 32 comprises a connection element 34 for connection of an electrical connector of one of the various interchangeable modular units 14 as well as a connection cable 36 for connection of the electrical interface 32 to the electrical connection 24 and thus to the electrical supply network of the aircraft.

The carrier platform 16 comprises a frame element 38, which is provided with a recess 40, in which the various interchangeable modular units 14 can be taken up at least in sections. The carrier platform 16 further comprises a panel element 42, which is connected to the frame element 38 on a side of the frame element 38 facing the primary structure 20 of the aircraft in the installed state of the aircraft ceiling liner element 12 in the aircraft and which covers the recess 40 provided in the frame element 38. In the embodiment shown here, the mechanical interface 26 and the electrical interface 32 are mounted on the panel element 42 of the carrier platform 16. In particular, the connection element 34 of the electrical interface 32 is arranged in the area of a surface of the panel element 42 of the carrier platform 16, which surface faces away from the primary structure 20 of the aircraft in the installed state of the aircraft ceiling liner element 12 in the aircraft. The connection cable 36 is arranged in the area of the surface of the panel element 42 of the carrier platform 16, which surface faces the primary structure 20 of the aircraft in the installed state of the aircraft ceiling liner element 12 in the aircraft.

In the area of an end section of the frame element 38 arranged in the direction of a transverse axis of the aircraft, at least a first lighting unit 44 is mounted on the frame element 38 of the carrier platform 16. The first lighting unit 44 may be connectable via the electrical interface 32 and the electrical connection 24 to the electrical supply network of the aircraft. Furthermore, the first lighting unit 44 may comprise an emergency lighting element, which is configured to illuminate a route leading to an emergency exit of the aircraft.

The modular unit 14 attached to the carrier platform 16 is provided in the embodiment shown here as a first storage compartment, which has a first storage volume. The modular unit 14 comprises a second lighting unit 46, which is connectable via the electrical interface 24 of the carrier platform 16, in particular by connecting of the electrical connector of the modular unit 14 to the connection element 34 of the electrical interface 32, to the electrical supply network of the aircraft. The second lighting unit 46 comprises an illuminated exit sign 48, an illuminated sign 50 for displaying an operating status of a sanitary module and a flight attendant call light 52. The exit sign 48 and the sign 50 for displaying an operating status of a sanitary module are mounted on an end face 54 of the modular unit 14 designed in the form of the first storage compartment. The end face 54 extends in the fitted state of the modular unit 14 in the aircraft substantially perpendicular to a longitudinal axis of the aircraft. The cabin call light 52 is mounted on a base area 56 of the modular unit 14 designed in the form of the first storage compartment, wherein the base area 56 faces a cabin floor of the aircraft in the fitted state of the modular unit 14 in the aircraft.

As shown in FIG. 3, a peripheral contour 58 of the carrier platform 16 is formed in such a way that this corresponds to a peripheral contour 60 of a standard aircraft ceiling liner element 62, so that the aircraft ceiling liner element 12 is installed in the aircraft instead of a standard aircraft ceiling liner element 62.

In FIG. 3, a schematic representation of an aircraft cabin is shown, in which the aircraft ceiling liner system 10 is installed with the vehicle ceiling liner element 12 and the modular unit 14 attached thereto, wherein the aircraft ceiling liner system 10 is arranged adjacent to standard aircraft ceiling liner elements 62 in the direction of the longitudinal axis of the aircraft. In the aircraft cabin several aircraft ceiling liner systems 10 can be arranged, which are installed at different positions in the aircraft, in particular spaced at a distance from one another.

In FIGS. 1 to 3, the modular unit 14 provided as a first storage compartment and attached to the carrier platform 16 is shown in a closed position. In the closed position, the modular unit 14 designed as a first storage compartment is attached to the carrier platform 16 and fixed relative to this, so that a transport item to be taken up in this can be stowed safely.

FIG. 4 shows another schematic view of the aircraft ceiling liner system 10 shown in FIGS. 1 to 3, in which the modular unit 14 attached to the carrier platform 16 and designed as a first storage compartment is arranged in an opening position. The modular unit 14 designed as a first storage compartment has an interior provided with a recess 64 to receive the transport item. The recess 64 comprises side walls and a base, which preferably have a shape that corresponds at least in sections to the shape of the transport item to be taken up therein.

In the opening position, the interior of the modular unit 14 designed as a first storage compartment with the recess 64 for taking up the transport item is released for loading and unloading. In other words, the modular unit 14 designed as a first storage compartment is arranged in the opening position as compared with the closed position pivoted about a pivot axis extending in the transverse direction of the aircraft, so that the recess 64 is not concealed by the panel element 42 of the carrier platform 16.

To attach the modular unit 14 to the carrier platform 16 pivotably between the closed position and the opening position, the first and second hinge seat 28, 30 of the mechanical interface 26 comprise a first latching element 66, 68, which is provided respectively in the form of an opening formed in the respective hinge seat 28, 30. The first latching element 66, 68 is configured to latch detachably with a complementary second latching element 70, 72 mounted on the various interchangeable modular units 14, in order to attach the interchangeable modular units 14 detachably and in a load-transferring manner to the carrier platform. The second latching element 70, 72 is designed in the form of a projection flexibly preloaded in the direction of the first latching element 66, 68 on a limb 74, 76 of a first and second hinge 78, 80. The first and second hinge 78, 80 are, as indicated in FIG. 5 by arrows, insertable into the first and second hinge seat 28, 30 of the carrier platform 16 and each comprise a hinge forming the pivot axis. In the fitted state of the modular unit 14 in the aircraft, the respective limbs 74, 76 of the first and second hinge 78, 80 are accordingly positioned in the respective first and second hinge seat 28, 30 of the carrier platform, so that the first latching element 66, 68 is latched with the second latching element 70, 72 and the modular unit 14 is attached detachably and in a load-transferring manner to the carrier platform 16.

Figure 6:
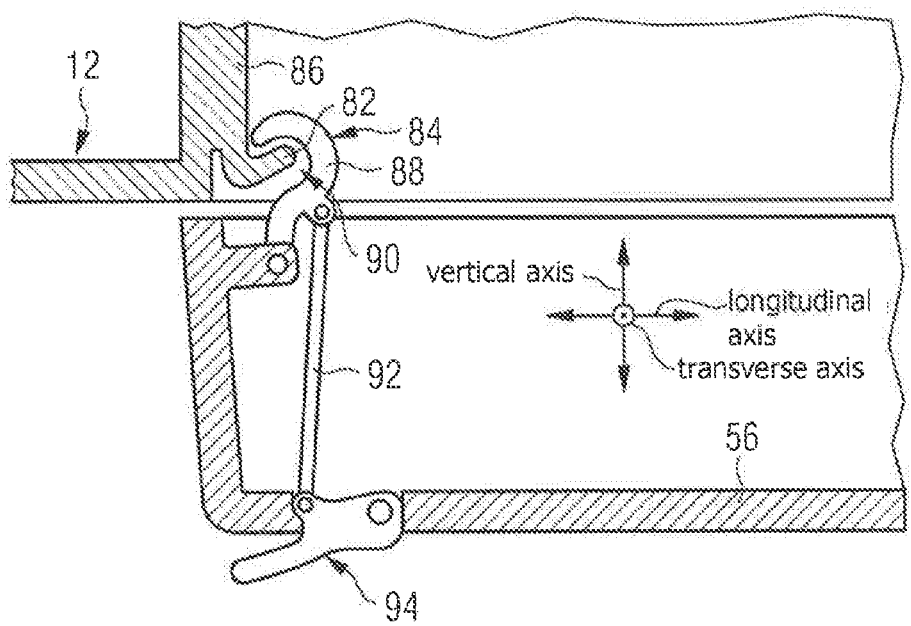
FIG. 6 shows an enlarged section of the aircraft ceiling liner system shown in FIGS. 1 to 5.

As shown in FIG. 6, the mechanical interface 26 of the aircraft ceiling liner element 12 further comprises a first locking element 82, which is configured to interact detachably with a complementary second locking element 84 mounted on the various interchangeable modular units 14. One of the various interchangeable modular units 14 can be held in the closed position on the carrier platform 16 by the interaction of the first and second locking element 82, 84.

The first locking element 82 is provided in the form of another projection formed on an inner wall 86 of the recess 40 of the frame element 38, wherein the inner wall 86 of the recess 40 is arranged substantially perpendicular to the longitudinal direction of the aircraft and lying opposite to an area of the carrier platform 16 taking up the first and second hinge seat 28, 30.

The second locking element 84 mounted on the modular unit 14 designed as a first storage compartment comprises a hook element 88, which is provided with a recess 90 capable of taking up the first locking element 82 of the mechanical interface 26. The hook element 88 is mounted pivotably on the modular unit 14 and connected via a rod-shaped link element 92 to an actuating element 94. The actuating element 94 is configured to pivot the hook element 88 between a locking position, in which the first and second locking element 82, 84 are in engagement with one another, and an unlocking position, in which the first and second locking element 82, 84 are released from one another. The actuating unit 94 is arranged on the base area 56 of the modular unit 14.

Figure 7:
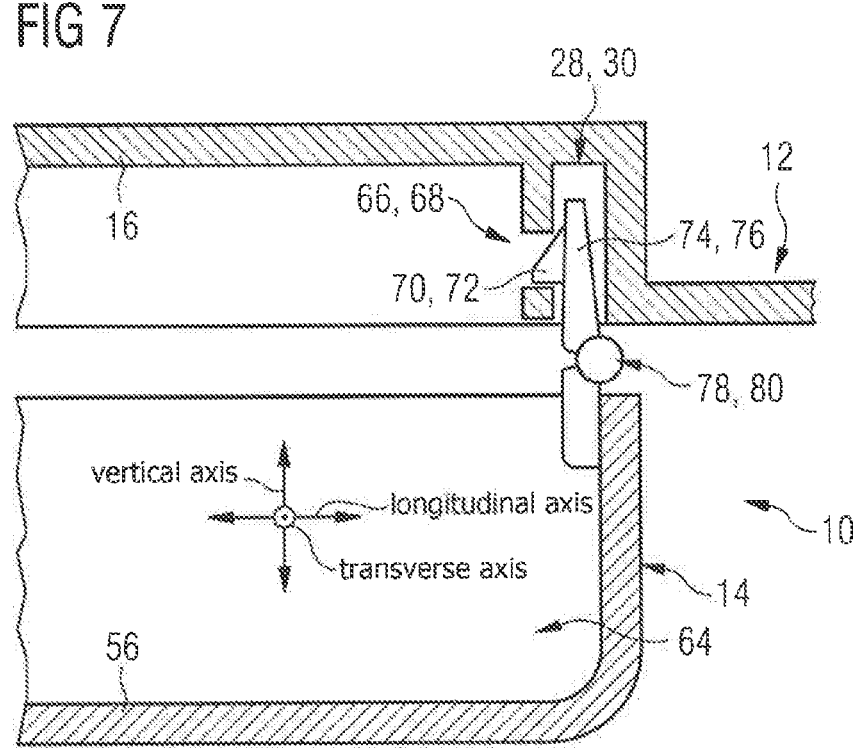
FIG. 7 shows an enlarged section of a second embodiment of the aircraft ceiling liner system.

FIG. 7 shows an enlarged section of a longitudinal section of a second embodiment of the aircraft ceiling liner element 10. Compared with the embodiment previously described, the first and second hinge seat 28, 30 are arranged completely in the recess 40 of the frame element 38. The first and second hinge seat 28, 30 are arranged lying opposite to the inner wall 86 of the recess 40 in such a way that in the fitted state of the modular unit 14 in the aircraft, the first latching element 66, 68 and the second latching element 70, 72 are accessible to a fitter in the opening position of the modular unit 14 via the recess 40, in order to uncouple the first and second latching element 66, 68, 70, 72 from one another. In other words, to detach the modular unit 14 from the carrier platform 16 the fitter can uncouple the first and the second latching element 66, 68, 70, 72 from one another by moving the second latching element 70, 72 against the direction of its preloading.

FIGS. 8 and 9 show a third embodiment of the aircraft ceiling liner system 10, in which the modular unit 14 is provided in the form of a second storage compartment with a second storage volume, which is attached to the carrier platform 16 detachably and in a load-transferring manner. The second storage volume is smaller than the first storage volume of the first storage compartment. In FIG. 9 the mounting 18 of the aircraft ceiling liner element 12 is not shown for reasons of clarity.

Figure 10:
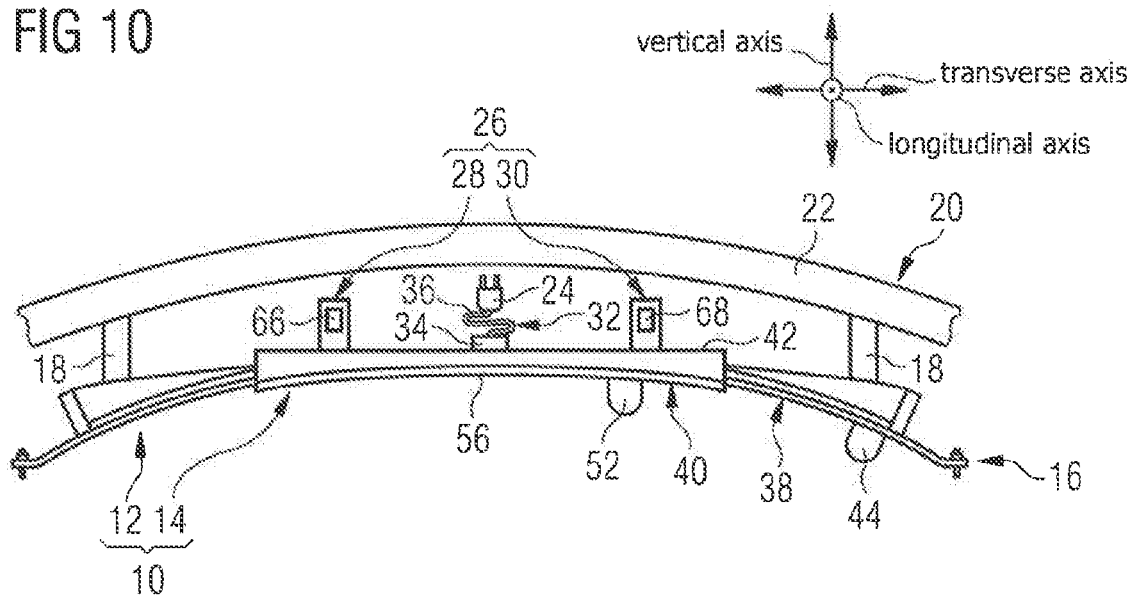
FIGS. 10 and 11 show a fourth embodiment of the aircraft ceiling liner system.
Figure 11:
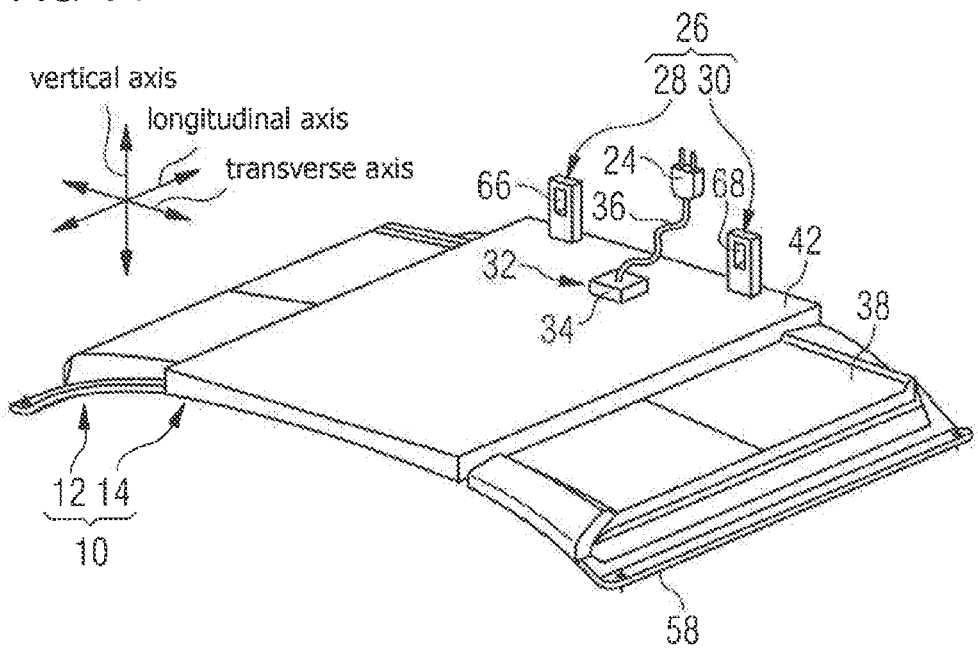

FIGS. 10 and 11 show a fourth embodiment of the aircraft ceiling liner system 10, in which the modular unit 14 is provided in the form of a cover element, which is attached detachably and in a load-transferring manner to the carrier platform 16. The modular unit 14 provided in the form of the cover element is arranged completely in the recess 40 of the frame element 38. In FIG. 11 the mounting 18 of the aircraft ceiling liner element 12 is not shown for reasons of clarity.

Figure 12:
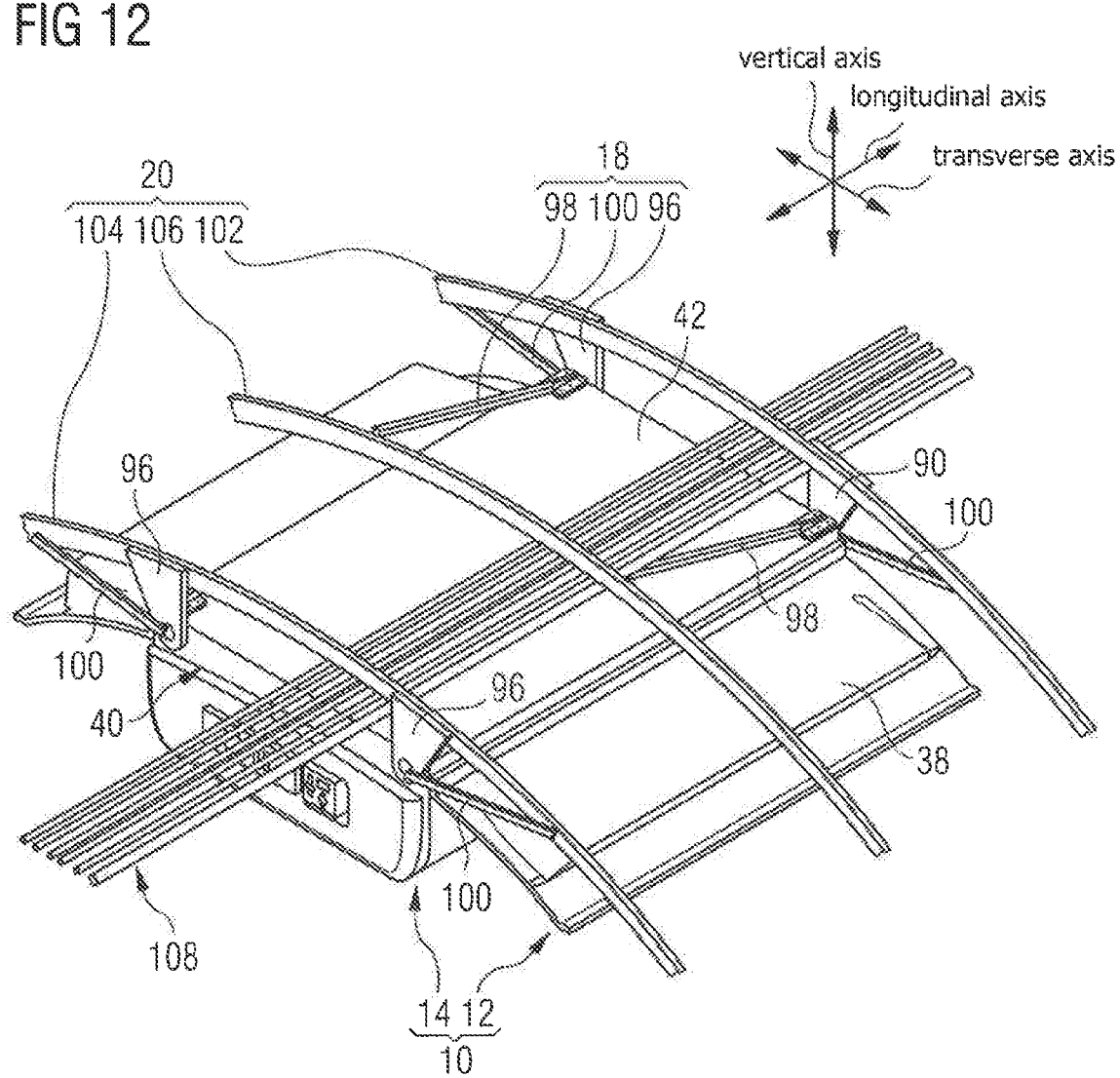
FIG. 12 shows another view in perspective of the aircraft ceiling liner system of the first embodiment shown in FIGS. 1 to 6, and, FIGS. 13 to 15 show other embodiments of the aircraft ceiling liner system.

FIG. 12 shows a top view in perspective of the aircraft ceiling liner system 10 of the first embodiment shown in FIGS. 1 to 6 installed in the aircraft. In the representation shown here, the mechanical and electrical interface and the electrical connection of the aircraft ceiling liner element 12 are not shown for reasons of clarity.

The mounting 18 of the aircraft ceiling liner element 12 comprises four first mounting elements 96 spaced at a distance from one another, which extend along a vertical axis of the aircraft and are provided in the form of pressed sheet metal parts. The first mounting elements 96 are configured in particular to transmit forces acting on the aircraft ceiling liner element 12 in the direction of the vertical axis of the aircraft to the primary structure 20 of the aircraft. Furthermore, the mounting 18 comprises two second mounting elements 98 spaced at a distance from one another, which lie in a plane spanned by the vertical axis and the longitudinal axis of the aircraft and are arranged at an angle offset to the vertical axis and longitudinal axis of the aircraft. The second mounting elements 98 are configured in particular to transmit forces acting on the aircraft ceiling liner element 12 in the direction of the longitudinal axis of the aircraft to the primary structure 20 of the aircraft. The mounting 18 further comprises four third mounting elements 100 spaced at a distance from one another, which lie in a plane spanned by the vertical axis and the transverse axis of the aircraft and are arranged at an angle offset to the vertical axis and transverse axis of the aircraft. The third mounting elements 100 are configured in particular to transmit forces acting on the aircraft ceiling liner element 12 in the direction of the transverse axis of the aircraft to the primary structure 20 of the aircraft. The second and third mounting elements 98, 100 are provided in the form of tubular struts.

The several first, second and third mounting elements 96, 98, 100 are connected at a first end to an edge section of the frame element 38 of the carrier platform 16 in the area of the recess 40 formed in the frame element 38. At a second end opposite the first end, the first, second and third mounting elements 96, 98, 100 are connected to the primary structure 20 of the aircraft. Two of the respective four first mounting elements 96 and third mounting elements 100 are connected to a first rib 102 of the primary structure 20, whereas the other two of the respective four first mounting elements 96 and third mounting elements 100 are connected to a second rib 104 of the primary structure 20 of the aircraft. The third mounting elements 100 extend from an attachment point on the frame element 38 of the carrier platform 16 in a direction facing away from a center of the carrier platform 16. Alternatively, the third mounting elements 100 may extend from the attachment point on the frame element 38 of the carrier platform 16 in the direction of a second end of one of the first mounting elements 96. The second mounting elements 98 are connected to a third rib 106 arranged between the first and second rib 102, 104.

The first, second and third mounting elements 96, 98, 100 are formed in such a way that a through opening arranged between the ribs 102, 104, 106 and the aircraft ceiling liner element 12 extends along the longitudinal axis of the aircraft, along which run supply lines 108 of the aircraft.

Figure 13:
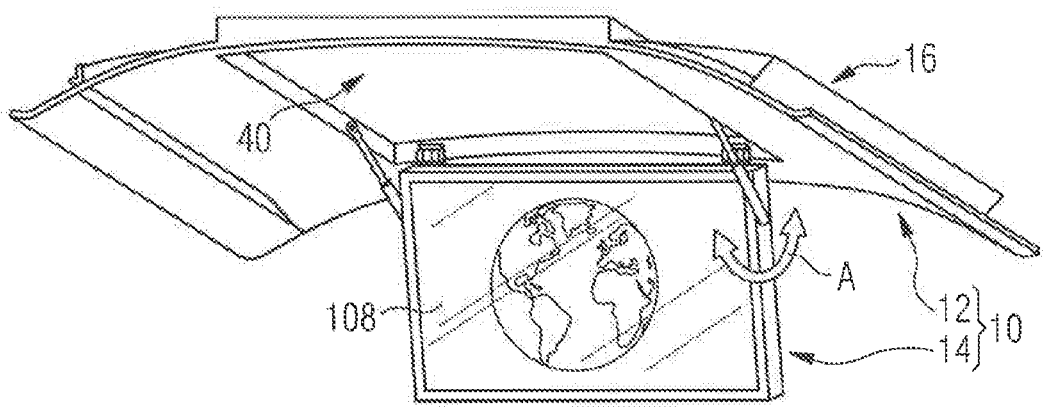
Figure 14:
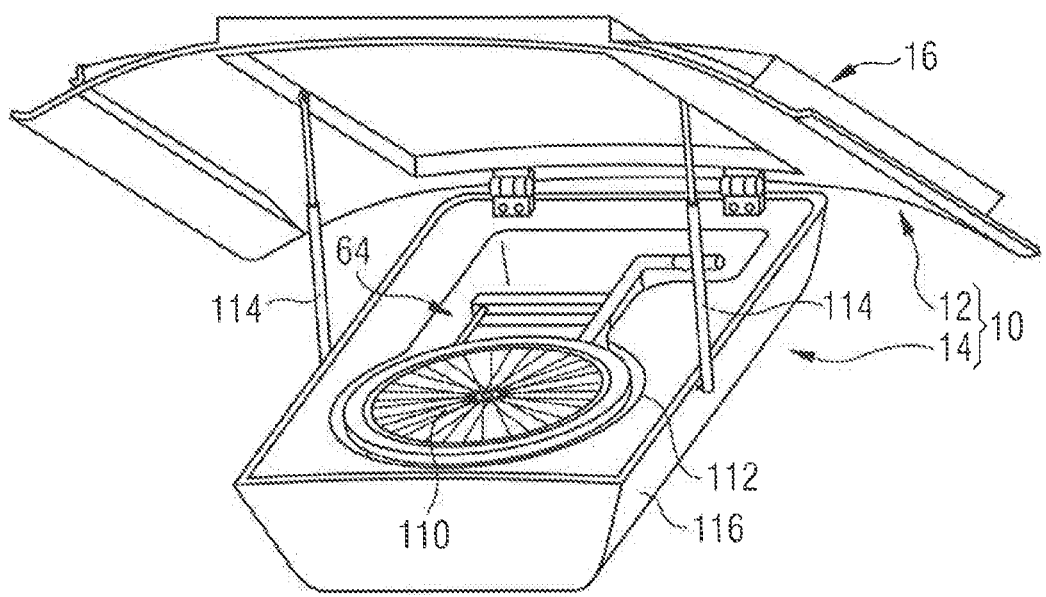
Figure 15:
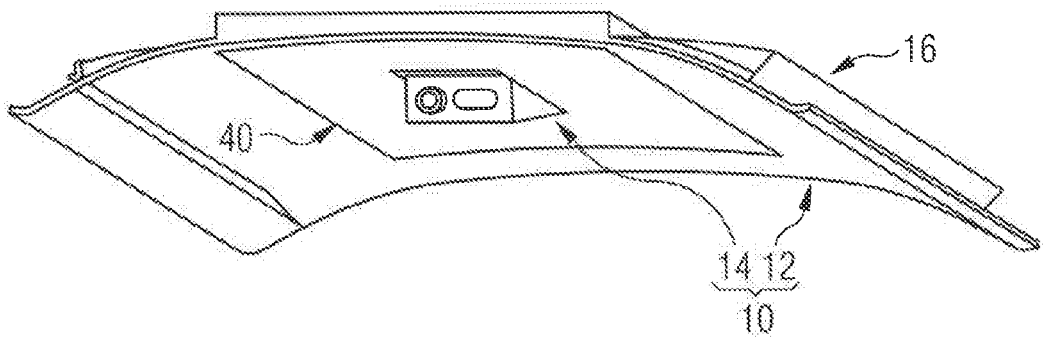

FIGS. 13 to 15 show other embodiments of the aircraft ceiling liner system 10. In FIG. 13, an aircraft ceiling liner element 12 is shown on which a modular unit 14 provided in the form of a folding flat monitor is attached to the carrier platform 16. The modular unit 14 provided in the form of a folding flat monitor is attached to the carrier platform 16 in such a way that this is arranged pivotably between the open position, in which a monitor panel 108 is arranged substantially perpendicular to the longitudinal axis of the aircraft, and the closed position, in which the modular unit 14 provided in the form of a folding flat monitor is arranged fully in the recess 40 formed in the carrier platform, as indicated by an arrow A in FIG. 13. In the closed position, the monitor panel 108 of the modular unit 14 provided in the form of a folding flat monitor is arranged lying opposite to the base of the recess 40 in the carrier platform 16.

FIG. 14 shows an aircraft ceiling liner system 10, which comprises a modular unit 14 designed as a third storage compartment with a stowage space provided by the recess 64 for receiving a transport item 110 provided as a wheelchair. The side walls 112 of the recess 64 have a shape that corresponds at least in sections to the shape of the transport item 110 provided as a wheelchair to be received therein. The transport item 110 provided as a wheelchair can thus be safely stowed in the modular unit 14 designed as a third storage compartment without additional attachment means. The aircraft ceiling liner system 10 may further comprise two damping elements 114, which are connected at a first end to the carrier platform 16 and at a second end opposite to the first end to side walls 116 of the modular unit 14 designed as a third storage compartment. The damping elements 114 are configured to brake a relative movement between the modular unit 14 and the aircraft ceiling liner element 12, to induce a tensile force between the modular unit 14 and the aircraft ceiling liner element 12 and/or to limit a pivot radius of the modular unit 14 relative to the aircraft ceiling liner element 12.

FIG. 15 shows a modular unit 14 formed as a projector, which is attached to the aircraft ceiling liner element 12 and is taken up in sections in the recess 40 of the carrier platform 16.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:
1. An aircraft ceiling liner element comprising:
a load-bearing carrier platform configured to form a part of an aircraft ceiling liner,
a mounting mounted on the carrier platform and connectable to a primary structure of the aircraft,
an electrical connection mounted on the carrier platform and connectable to an electrical supply network of the aircraft,
a mechanical interface mounted on the carrier platform and configured to attach various interchangeable modular units detachably and in a load-transferring manner to the carrier platform, and
an electrical interface mounted on the carrier platform and configured to create an electrical connection between the modular unit and the carrier platform.

2. The aircraft ceiling liner element according to claim 1, wherein a peripheral contour of the carrier platform corresponds to a contour of a standard aircraft ceiling liner element, so that the aircraft ceiling liner element can be installed in the aircraft instead of the standard aircraft ceiling liner element.

3. The aircraft ceiling liner element according to claim 1, wherein the carrier platform comprises a frame element provided with a recess in which the various interchangeable modular units can be taken up at least in sections.

4. The aircraft ceiling liner element according to claim 3, wherein the carrier platform further comprises a panel element connected in an installed state of the aircraft ceiling liner element in the aircraft to the frame element on a side of the frame element facing the primary structure of the aircraft and covering the recess in the frame element, and
wherein at least one of the mechanical interface and the electrical interface is mounted on the panel element of the carrier platform.

5. The aircraft ceiling liner element according to claim 3, wherein at least a first lighting unit is mounted on the carrier platform on the frame element of the carrier platform, the first lighting unit being connectable via the electrical interface to the electrical supply network of the aircraft, and
wherein the first lighting unit comprises an emergency lighting element configured to illuminate a route to an emergency exit of the aircraft.

6. The aircraft ceiling liner element according to claim 1, wherein the mechanical interface comprises a first latching element configured to latch detachably with a complementary second latching element mounted on the various interchangeable modular units in order to attach one of the various interchangeable modular units in a load-transferring manner to the carrier platform, and
wherein the first latching element is formed on a hinge seat into which a first limb of a hinge mounted on the one of the various interchangeable modular units is insertable in order to attach the one of the various interchangeable modular units to the carrier platform pivotably between a closed position and an opening position.

7. The aircraft ceiling liner element according to claim 1, wherein the mechanical interface comprises a first locking element configured to interact detachably with a complementary second locking element mounted on the various interchangeable modular units, and
wherein one of the various interchangeable modular units is held in a closed position on the carrier platform by the interaction of the first locking element with the second locking element.

8. The aircraft ceiling liner element according to claim 1, wherein the electrical interface comprises a connection element for connecting to an electrical connector of one of the various interchangeable modular units, the connection element including a connection cable for connecting the electrical interface to the electrical supply network of the aircraft, and
wherein the connection element is arranged in an area of a surface of the panel element of the carrier platform and the surface facing away from the primary structure of the aircraft in the installed state of the aircraft ceiling liner element in an aircraft, and
wherein the connection cable is arranged in the area of a second surface of the panel element of the carrier platform and the second surface facing the primary structure of the aircraft in the installed state of the aircraft ceiling liner element in an aircraft.

9. An aircraft ceiling liner system, which comprises:
an aircraft ceiling liner element according to claim 1, and
at least one of the various interchangeable modular units attached detachably and in a load-transferring manner and interchangeably with another modular unit to the carrier platform.

10. The aircraft ceiling liner system according to claim 9, wherein the at least one modular unit comprises at least one of: a first storage compartment with a first storage volume; a second storage compartment with a second storage volume smaller than the first storage volume of the first storage compartment; a cover element; or, a lighting panel designed in the form of at least one of an ambient light panel and a display monitor.

11. The aircraft ceiling liner system according to claim 9, further comprising:
a lighting unit mounted on the at least one modular unit and connectable to the electrical supply network of the aircraft, via the electrical interface by connection of an electrical connector of the least one modular unit to a connection element of the electrical interface.

12. The aircraft ceiling liner system according to claim 11, wherein the lighting unit comprises an illuminated exit sign, an illuminated sign for displaying an operating status of a sanitary module, a flight attendant call light, or a combination thereof, and
wherein the exit sign, the sign for displaying an operating status of a sanitary module, or both are mounted on an end face of a modular unit in the form of a storage compartment, the end face extending substantially perpendicular to a longitudinal axis of the aircraft in the fitted state of the modular unit in an aircraft, and
wherein the flight attendant call light is mounted on a base area of a modular unit in the form of a storage compartment, the base area facing a cabin floor of the aircraft in a fitted state of the modular unit in an aircraft.

13. The aircraft ceiling liner system according to claim 9, further comprising:
a modular unit in the form of a storage compartment having an interior provided with a recess for a transport item, and
wherein at least one of side walls and a base of the recess has a shape corresponding, at least in sections, to a shape of the transport item received in the recess.

* * * * *